Feb. 20, 1940.  L. B. ROTH  2,191,135
POWER MOWER
Filed July 19, 1937  4 Sheets-Sheet 1

L. B. ROTH  INVENTOR.
BY Merrill M. Blackburn.
ATTORNEY.

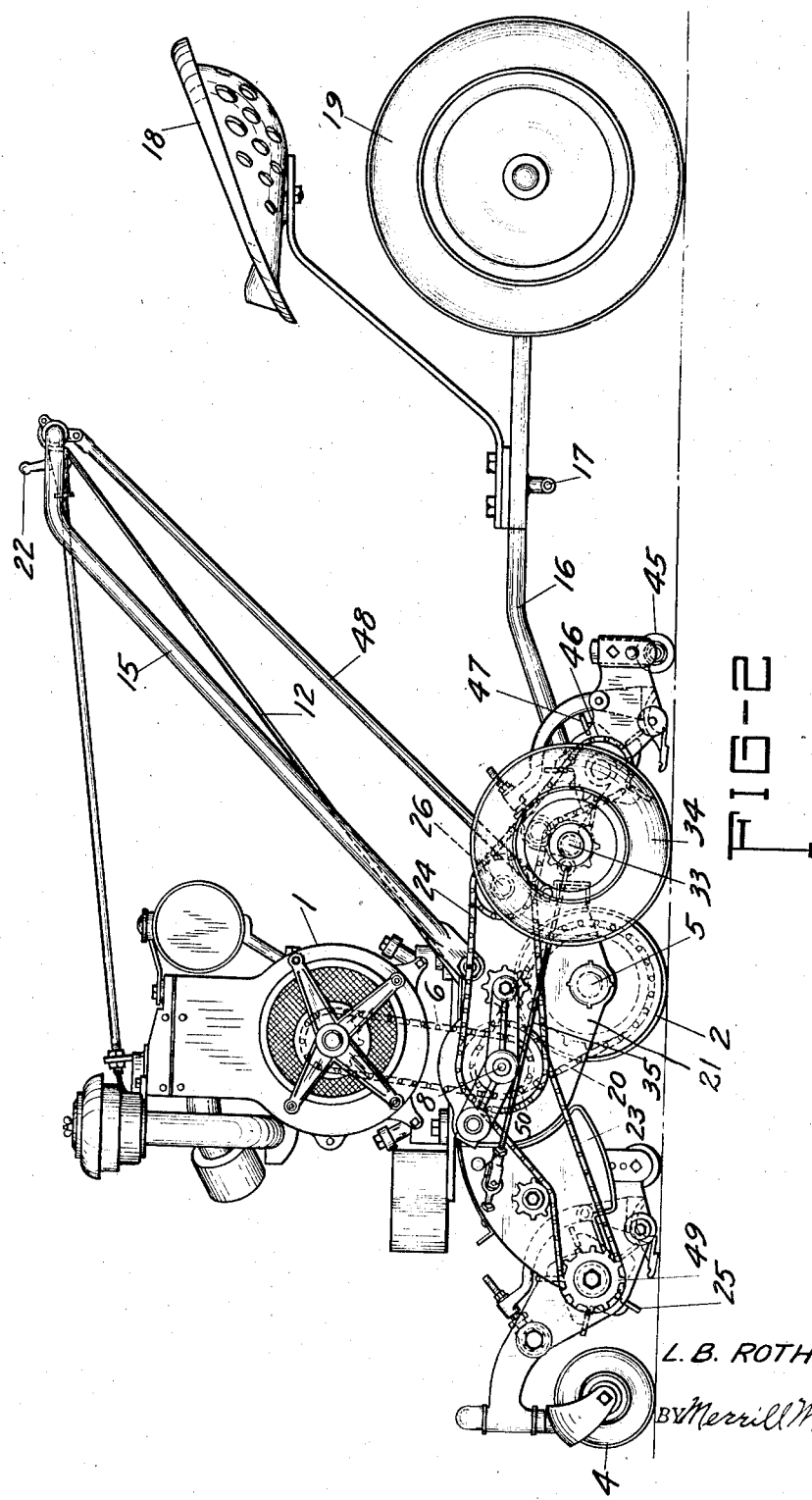

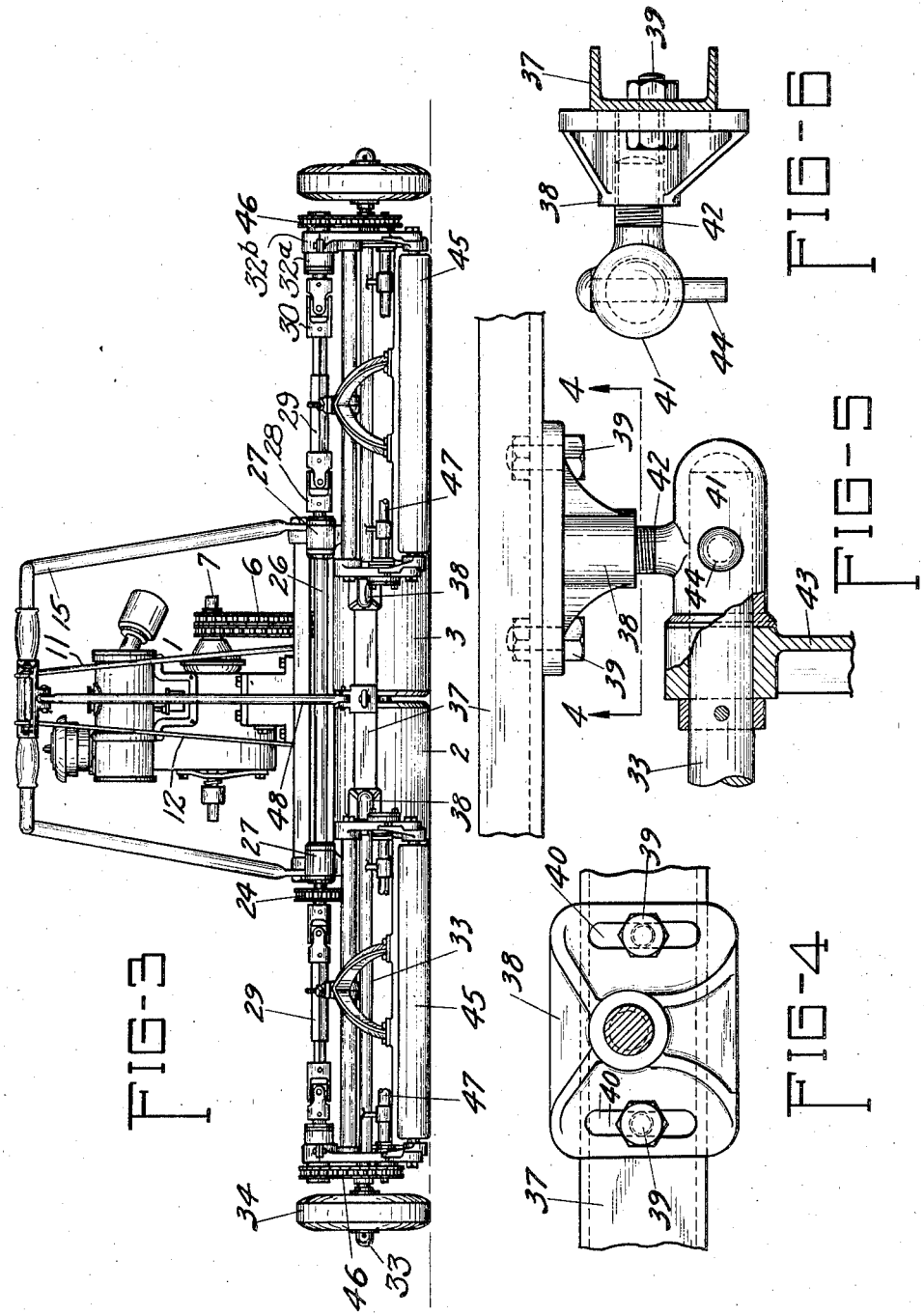

Feb. 20, 1940.    L. B. ROTH    2,191,135
POWER MOWER
Filed July 19, 1937    4 Sheets-Sheet 4

L. B. ROTH  INVENTOR.
BY Merrill M. Blackburn
ATTORNEY

Patented Feb. 20, 1940

2,191,135

UNITED STATES PATENT OFFICE 2,191,135

POWER MOWER

Lester B. Roth, Prophetstown, Ill., assignor to Eclipse Lawn Mower Company, Prophetstown, Ill., a corporation of Illinois Application July 19, 1937, Serial No. 154,435

6 Claims. (Cl. 56—7)

The present invention pertains to self-propelled mowers and more particularly to improvements in power lawn mowers of the plural unit type. Speaking broadly, the object of this invention is to improve in general upon the construction of mowers of the type indicated. More specifically, it is my purpose to provide an improved driving connection from the power unit to the mower reels; to provide an improved drive for the reels of the side sections of a plural section mower; to provide means for adjusting the tightness of the reel drive chains of a mower of the character indicated; to provide an improved connection of the side units to the central unit; to provide an improved sulky connection for hitching a sulky to the mower proper; to provide an improved power transmission means for transmitting power from the power unit to the side reels of the machine; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof:

Fig. 2 represents a side elevation of the construction shown in Fig. 1;

Fig. 3 represents a rear elevation of this construction with the sulky omitted;

Fig. 4 represents a section taken approximately along the plane indicated by the line 4—4, Fig. 5;

Fig. 5 represents a fragmentary plan view, partly broken away, of a part of the connection whereby a side unit is connected to the central unit;

Fig. 6 represents an elevation of the structure shown in Fig. 5, the same being taken from the right hand side of this figure, part of the structure illustrated in Fig. 5 being omitted;

Figure 1:
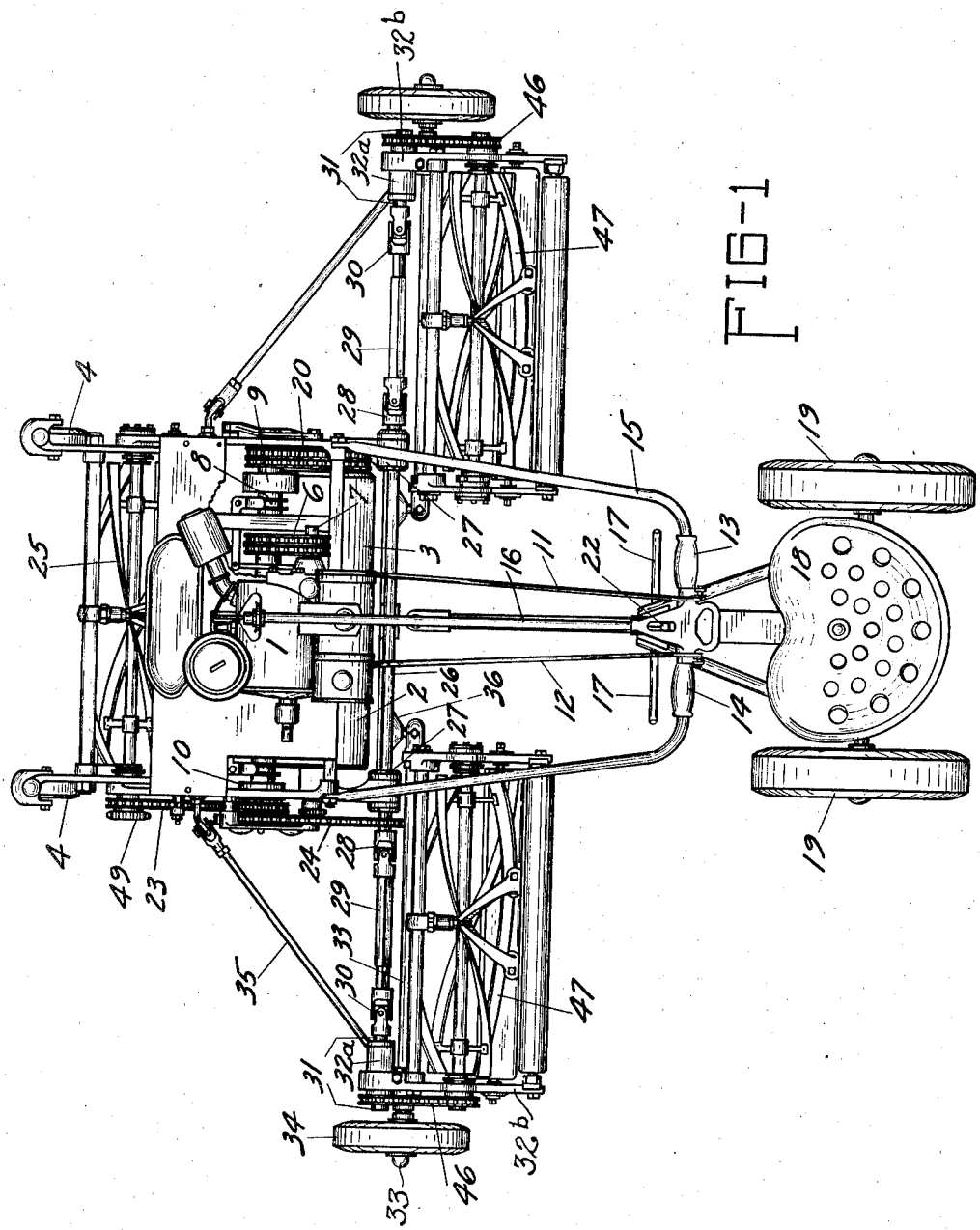
Fig. 1 represents a plan view of a mower embodying my present invention.
Figure 7:
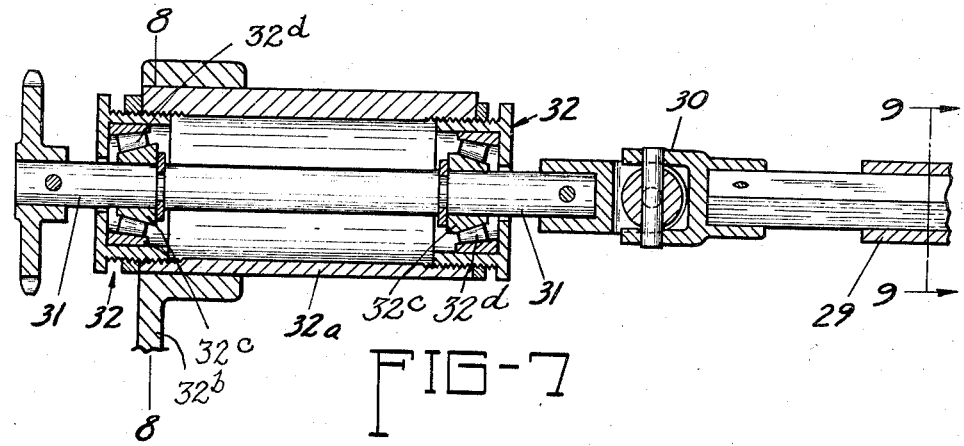
Fig. 7 represents in longitudinal section the left hand end of the drive shaft for the left hand cutter unit, such section being on a larger scale than shown in Fig. 1.
Figures 8, 9:
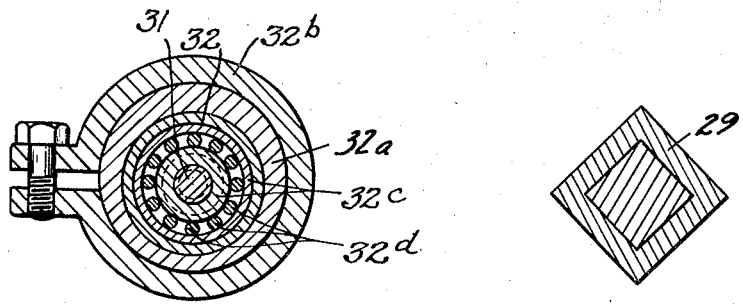
Fig. 8 represents a transverse section substantially along the plane indicated by the line 8—8 of Fig. 7.
Fig. 9 represents a transverse section substantially along the plane indicated by the line 9—9 of Fig. 7.
Figure 10:
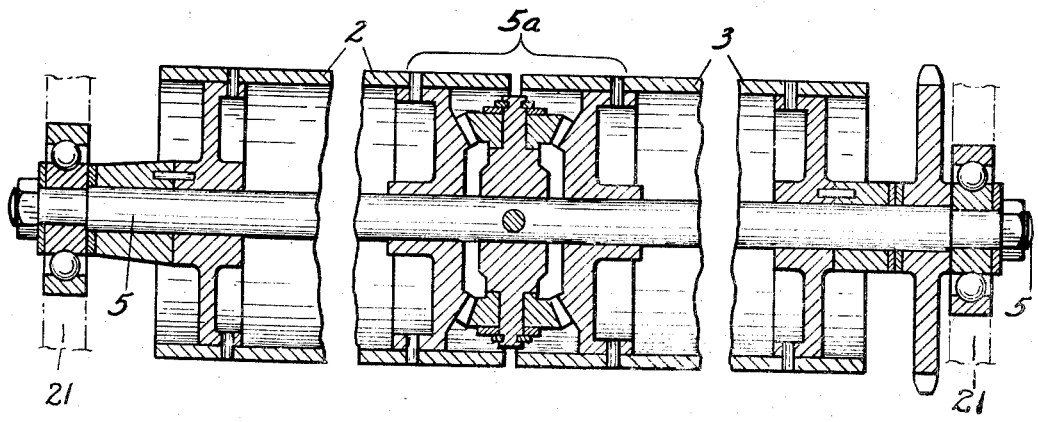
Fig. 10 represents a fragmentary longitudinal section of the drive rollers 2 and 3 following the central cutting section.

Reference will now be made in greater detail to the annexed drawings for a more complete description of this invention. As is common with machines of this general type, the central unit is provided with a frame for supporting the power unit 1 and other parts of the machine. This frame is supported on a pair of rollers 2 and 3 and caster wheels 4. A shaft 5 passes centrally through the rollers 2 and 3 and is mounted at its ends in the side frame members 21 of the main or central unit. The rollers 2 and 3 are connected in driving relation by any suitable differential mechanism, as indicated at 5a. A double chain 6 transmits power from the motor shaft 7 to the power transmission shaft 8 upon which are mounted suitable sprockets which are free of driving connection with the shaft 8 but may be clutched thereto by the clutches 9 and 10. The clutch 9 is operated by the link 11 and the clutch 10 by the link 12, these links being actuated by the grips 13 and 14 on the handle 15 of the machine.

A sulky comprising the hitch rod 16, having foot-rests 17, a seat 18, and wheels 19, is hitched to the main frame, detachably, and furnishes means whereby the operator may ride when operating the machine.

A double chain 20 connects the power transmission shaft 8 to the shaft of the roller 3 for the driving of the rollers when the clutch 9 is engaged. Normally, the power transmitted to this shaft is transmitted to the roller 3 and also through the differential 5a to the roller 2. However, if the handle 15 is swung laterally, the differential will operate, after the manner of the differential of an automobile, to permit different rates of rotation of the rollers 2 and 3. Also, if the machine is standing still and the handle 15 is swung to one side, one roller is likely to roll backwardly and the other forwardly. Normally, when the motor 1 is operating and the clutch 9 is engaged, the machine will be propelled forwardly. The speed of operation of the machine is controlled by a throttle control handle 22, located adjacent the end of the handle 15 and near the driver's seat 18.

When the clutch 10 is engaged it causes driving of the chains 23 and 24, the former operating the reel 25 of the central cutting unit and the latter operating the shaft 26 by means of which power is transmitted to the cutting reels of the side units. The shaft 26 is made up of several parts, the main part being mounted in bearings 27 in the main frame and having universal couplings 28 at the ends thereof (see Fig. 1). To these universals are connected tubular shafts 29 made up of relatively slidable parts (see Figs. 1 and 3) which may move relatively to each other to accommodate differences in distance between the universals 28 and 30, as the outer ends of the side units may move up or down in compensating for changes in contour of the ground. The end sections 31 of the shaft 26 are mounted in bearings 32 in the outside frames of the side units. Therefore, the direction of the stub shaft 31 will change as the vertical inclination of a side unit changes. The bearings 32 comprise eccentrics 32a, bearing rings 32c, and antifriction devices 32d, the eccentrics 33a being mounted in frame members 32b.

A shaft 33 constitutes a part of each side unit and is rigidly mounted in the frame members of this unit. On the outer end of this shaft 33 is mounted the side supporting wheel 34 for the side unit. A brace rod 35 connects the side frame member of the central unit with the outer side frame member of the side unit to assure proper bracing thereof without putting undue strain on the rest of the side unit hitch. This latter, denoted in Fig. 1 by the numeral 36, is shown in detail in Figs. 4, 5, and 6 on Sheet 3.

The main frame member 37, preferably made from channel iron, has an internally screw-threaded socket member 38 connected thereto by the bolts 39. This socket member has slots 40 in its attaching flanges and these permit vertical adjustment of this member with relation to the bar 37. A socket member 41 has a screw-threaded stud 42 projecting from one side thereof, which stud is screwed into the socket of member 38. The end of shaft 33 projects beyond side frame member 43 of the side unit and may be inserted into the socket of member 41 and fastened therein by the pin 44. The screw-threaded connection between parts 38 and 42 permits vertical turning movement of the side units in compensating for surface irregularities of the ground. Heighth of cut of the side units may be adjusted by adjusting the rollers 45, as is customary with mowers.

The bearings in which the shaft sections 31 are mounted are surrounded by eccentrics 32a which may be rotated in the side unit frame members 32b to change the positions of the sections 31, resulting in the tightening of the chains 46 which drive the reels 47. In this way, a proper tension can always be maintained on the chains 46 to prevent them from jumping from the sprockets over which they run. A brace member 48 connects the frame member 37 and the handle 15 to give rigidity to the connection of the handle with the body of the machine. An extra sprocket wheel 49 is mounted on the end of the shaft of reel 25 in line with the sprockets over which the chain 24 runs. By lengthening this chain and properly arranging it around the sprockets, the motor may be made to run the reels 25 and 47 backwardly for sharpening purposes. In doing this, the upper strand of chain 24 must pass under the sprocket 50, instead of over, as shown most clearly in Fig. 2.

It is of course understood that the specific description of structure set forth above may be departed from without departing from the spirit of my invention as set forth in this specification and the appended claims.

Having now described my invention, I claim:

1. In a plural cutter section power lawn mower; a pair of rollers for supporting and propelling the mower; a frame supported in part by the rollers; a motor on the frame for driving the rollers; and a pair of transversely spaced, substantally aligned cutter units hitched to the frame, each having a supporting shaft, supported at one end by a wheel and at its other end by a pivot connection to the frame.

2. A power lawn mower comprising a frame and a plurality of mowing units connected together; said units comprising a main unit and side units attached to the main unit, the side units being laterally spaced and substantially aligned; rotating supporting units to support a major portion of the weight of the frame and its superstructure; said frame being supported by said supporting units; hitch shafts to serve as connecting means to connect the side units to the main unit; said shafts being pivotally connected to the main unit frame, thus enabling the side units to have vertical pivotal motion with relation to the main unit whereby the machine may adapt itself to uneven ground, the means for pivotally connecting the shafts to the frame being vertically adjustable for adjusting the side units so that they will cut at the same height at both ends.

3. In a lown mower having a central cutting section and laterally spaced, side cutting sections, the central section having a frame and the side sections having supporting shafts, one end of each of which is supported by a wheel and the other end by the frame, a pivotal connection between each shaft and the frame to permit the mower sections to accommodate themselves to the ground contour, and adjustable means for adjusting the cutting height of the sections.

4. In a lawn mower having central and laterally spaced side cutting units, of the cutting reel type, a supporting frame, a power plant maintained thereon, and driving connections therefrom to the cutting reel of the central unit; a drive shaft mounted in the rear portion of the central unit and drive connections thereto from the power plant, drive connections from the drive shaft to the cutting reels of the side units, and universal joints in the section of the drive shaft associated with each side unit, each side unit being provided with a hitch shaft by means of which it is connected to the central unit and each hitch shaft having swivel connection with the central unit so that it may shift vertically to enable the mower to conform to the ground contour.

5. In a power mower, a central unit and a pair of laterally spaced side units of the cutter reel type in approximate alignment, and each provided with a frame, the central unit having a power unit mounted thereon for driving the machine and its reels, a main shaft mounted in the frames of the central and side units to be driven from the power unit and to drive the reels of the side units, and eccentrics in the side unit frames for supporting and moving the ends of the main shaft to tighten the driving means for the reels.

6. A structure as defined by claim 5 having hitch rods extending diagonally from the outer frames of the side units to the side frames of the central unit.

LESTER B. ROTH.